(12) United States Patent  (10) Patent No.: US 8,792,113 B2
Hiroshige et al.  (45) Date of Patent: Jul. 29, 2014

(54) PRINTING DEVICE AND METHOD FOR CONTROLLING PRINTING DEVICE

(71) Applicant: Seiko Epson Corporation, Tokyo (JP)

(72) Inventors: Akira Hiroshige, Tokyo (JP); Mamoru Sakai, Kanagawa (JP); Katsuyuki Komatsu, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/870,607

(22) Filed: Apr. 25, 2013

(65) Prior Publication Data

US 2013/0321846 A1  Dec. 5, 2013

(30) Foreign Application Priority Data

May 30, 2012 (JP) ................................ 2012-122791

(51) Int. Cl.
*G06F 3/12* (2006.01)
*G06K 15/00* (2006.01)
*H04N 1/46* (2006.01)

(52) U.S. Cl.
CPC ............... *G06K 15/408* (2013.01); *G06F 3/12* (2013.01); *G06K 15/4095* (2013.01)
USPC ........... 358/1.14; 358/1.1; 358/1.15; 358/508

(58) Field of Classification Search
USPC ......... 358/1.14, 1.1, 1.15, 501, 508; 726/3, 1, 726/2, 5, 4, 14, 10, 26, 27, 34, 21; 713/168, 713/170, 183, 178, 155, 182; 709/224, 227, 709/223
See application file for complete search history.

(56) References Cited

U.S. PATENT DOCUMENTS

2006/0128360 A1* 6/2006 Hibino .......................... 455/411
2011/0231902 A1* 9/2011 Nagasaki et al. ................. 726/3

FOREIGN PATENT DOCUMENTS

JP  2011-082922 A  4/2011

OTHER PUBLICATIONS

Brocade Communication Syatems Inc., Configuring 802.1X Port Security, 2009, Brocade Communication System Inc., Chapter 5, All Pages.*

* cited by examiner

*Primary Examiner* — Ngon Nguyen
(74) *Attorney, Agent, or Firm* — Global IP Counselors, LLP (57) ABSTRACT

The advantage of the invention is to prevent the efficiency of printing from being deteriorated due to execution of an authentication process during a print process by arranging an authentication process not to be conducted during a print process. The multi-purpose device is connected to the authentication switch through the LAN. The authentication switch conducts an authentication process of a device connected to the LAN, and disconnects a connection between the device and the network in a case where the device cannot be authenticated. The multi-purpose device has the authentication requesting section that requests the authentication process with respect to the authentication switch; and the printing mechanism that prints print data. In a case where the printing mechanism conducts the print process, the authentication requesting section requests the authentication process before the printing mechanism starts the print process.

9 Claims, 6 Drawing Sheets

PRINTING DEVICE AND METHOD FOR CONTROLLING PRINTING DEVICE

CROSS-REFERENCE TO RELATED APPLICATIONS

This application claims priority to Japanese Patent Application No. 2012-122791 filed on May 30, 2012. The entire disclosure of Japanese Patent Application No. 2012-122791 is hereby incorporated herein by reference.

BACKGROUND

1. Technical Field

The present invention relates to a printing device, a printing system, and a method for controlling the printing device, in which communication is conducted by connecting to a network.

2. Background Technology

In a communication device that conducts communication by connecting to a network, an authentication process is needed for connecting to a network. As a standard for this authentication process, the IEEE (Registered Trademark) 802.1X standard described, for example, in Patent Document 1 is known. According to the IEEE (Registered Trademark) 802.1X standard, a communication device conducts two-way authentication with respect to an authentication server through a network, and only a communication device that has succeeded in the authentication is allowed to communicate through a network, thereby tightening the security. Further, according to the IEEE (Registered Trademark) (802.1X standard, even in a case where a communication device has been authenticated and connected to a network, the communication device is required to get re-authentication for each predetermined period of time. Accordingly, in the case of a printing device provided with the above-described communication device, a request for a re-authentication process will come in while a print process is being conducted, and a process required for re-authentication needs to be conducted concurrently with the print process so as to maintain the connection to the network in such a case.

Japanese Laid-open Patent Publication No. 2011-82922 (Patent Document 1) is an example of the related art.

SUMMARY

Problems to Be Solved by the Invention

There are cases, however, in which the throughput of reception of print data is temporarily deteriorated because transmission and reception of data for authentication and reception of print data are conducted concurrently on the same network route if an authentication process is conducted in the middle of receiving an enormous quantity of print data. Especially, if a print process is conducted by receiving print data for each page or for each line and sequentially printing the received print data in the environment in which a low-speed network line is used or the line is busy, the reception speed of print data is lower than the processing speed of printing, and there is fear that the print process is interrupted.

Means Used to Solve the Above-Mentioned Problems

The invention has been made to address the above-described circumstances, and the advantage of the invention is to prevent the efficiency of printing from being deteriorated due to execution of an authentication process during a print process by arranging an authentication process not to be conducted during a print process.

A printing device of the invention, to be connected to an authentication device that disconnects a connection between a device and a network in a case where authentication of the device connected to the network fails, includes an authentication requesting means that requests the authentication process with respect to the authentication device, and a print processing means that conducts a print process. In the printing device, in a case where the print processing means conducts the print process, the authentication requesting means requests the authentication process before the print processing means starts the print process.

With this configuration, since the authentication process is requested with respect to the authentication device before the print processing means starts the print process, the authentication process is conducted before the print process is conducted. Therefore, the efficiency of the print process can be prevented from being deteriorated due to execution of the authentication process during the print process.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, an embodiment of the invention will be described with reference to the drawings.

Embodiment

Figure 1:
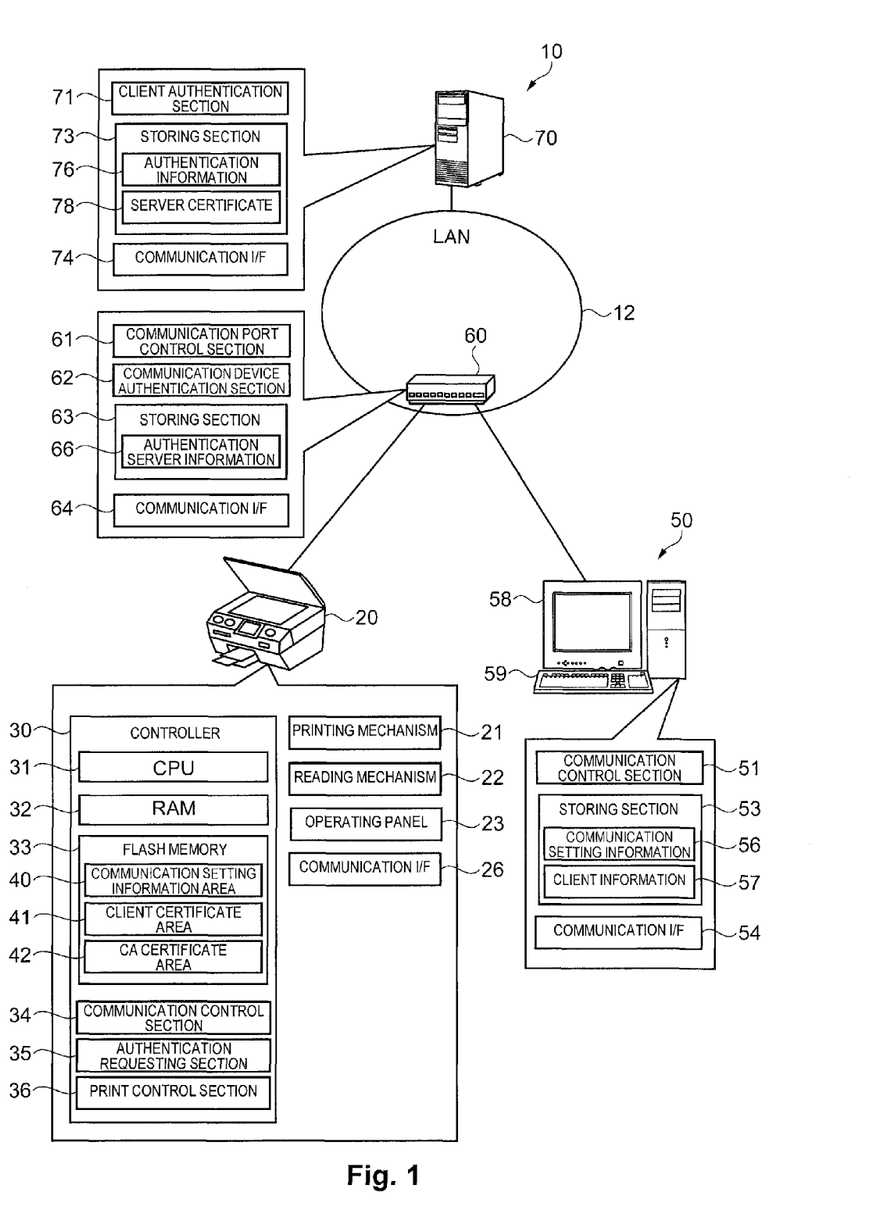
FIG. 1 is a configuration diagram that schematically illustrates a configuration of a network system provided with a multi-purpose device according to an embodiment of the invention.

FIG. 1 is a configuration diagram that schematically illustrates a configuration of a network system 10 provided with a multi-purpose device 20 as the embodiment of the printing device of the invention. As shown in the drawing, the network system 10 has a LAN 12, the multi-purpose device 20, a user PC 50, and an authentication server 70. The LAN 12 has an authentication switch 60. The authentication server 70 is connected to the LAN 12. The multi-purpose device 20 and the user PC 50 are connected to the LAN 12 through the authentication switch 60.

The LAN 12 has the authentication switch 60 as the authentication device, and is configured as a network in accordance with the IEEE (Registered Trademark) 802.1X standard. The authentication switch 60 is configured as a switching hub with an authentication function. The authentication switch 60 has a communication port control section 61, a communication device authentication section 62, a storing section 63, and a communication interface (I/F) 64. The communication port control section 61 controls a communication port which is not shown in the drawing. The communication device authentication section 62 conducts authentication of devices such as the multi-purpose device 20, the user PC 50, and the like, which are connected to the communication port. The storing section 63 stores various kinds of programs or various kinds of data. The communication interface (I/F) 64 is a device that communicates with the multi-purpose device 20, and the like. The authentication switch 60 is connected to the LAN 12, the multi-purpose device 20, and the user PC 50 through the communication I/F 64. The communication port control section 61 detects information transmitted from devices connected to the communication port such as the multi-purpose device 20, the user PC 50, and the like, so as to cause the communication device authentication section 62 to start an authentication process. Further, the communication port control section 61 allows the device that has succeeded in the authentication process to connect to the LAN 12, and disconnects a connection to the LAN 12 with respect to the device that has failed in the authentication process.

The communication device authentication section 62 conducts mediation of an authentication process between the authentication server 70 and the devices (also referred to as client) connected to the authentication switch 60 such as the multi-purpose device 20 or the user PC 50. More specifically, the communication device authentication section 62 converts a MAC frame, received from the client side such as the multi-purpose device 20 or the user PC 50 in the authentication process, into a RADIUS frame, and transmits it to the authentication server 70. The communication device authentication section 62 converts a RADIUS frame, received from the authentication server 70, into a MAC frame, and transmits it to the client. Further, the communication device authentication section 62 periodically conducts re-authentication to the client, that has succeeded in the authentication process and has been allowed to connect, in accordance with a predetermined period of time "T" (for example, 60 minutes). The communication device authentication section 62 also conducts re-authentication of the client based on a re-authentication request (authentication request signal) transmitted from the client that has been allowed to connect.

In the present embodiment, when re-authentication is conducted in response to the re-authentication request from the client, a timer for measuring (counting) time is reset, and counting the predetermined period of time "T" is started again. Further, in the present embodiment, the authentication process conducted through the authentication switch 60 is conducted by an EAP-TLS method as an authentication protocol (EAP) of IEEE (Registered Trademark) 802.1X. The EAP-TLS method is a method for conducting authentication by using an electronic certificate, in which authentication is conducted by transmitting and receiving data a plurality of times with a predetermined procedure. The storing section 63 stores information used for an authentication process such as authentication server information 66 that is information regarding the authentication server 70. Incidentally, the present embodiment uses IEEE (Registered Trademark) 802.1X as the standard of the network. However, the present embodiment is not limited to this as long as it is a standard for periodically conducting re-authentication to a connected device.

The multi-purpose device 20 is a device that has a scanner function, a printer function, and a copy function. The multi-purpose device 20 is connected to a network such as the LAN 12 or the like by conducting an authentication process in accordance with the IEEE (Registered Trademark) 802.1X standard. Then, the multi-purpose device 20 can acquire print data or data of an electronic certificate and the like from another device, connected to the network (for example, the user PC 50), by communication through the network, or can transmit scanned image data to another device through the network. The multi-purpose device 20 is connected to the authentication switch 60 through a communication I/F 26, for example, by a LAN cable. The multi-purpose device 20 has a printing mechanism 21, a reading mechanism 22, an operating panel 23, and a controller 30. The printing mechanism 21 generates an image based on print data onto a medium such as paper or the like. The reading mechanism 22 scans an image or the like on the medium to make image data. The operating panel 23 displays various kinds of information for a user, and various kinds of instructions are input to the operation panel 23 by a user. The controller 30 controls the entire device. The printing mechanism 21 is an ink-jet type mechanism (print means) that generates an image based on print data onto a medium by applying a pressure to ink of each color and ejecting this ink onto the medium. In the present embodiment, print data is transmitted from the user PC 50 through the LAN 12 for each plurality of lines. Regarding a mechanism for applying a pressure to ink, deformation of a piezoelectric element can be used, or generation of air bubbles by heat of a heater can be used.

The printing method is not limited to an ink-jet method, and an electrophotographic method such as a laser printer can be possible. In such a case, print data is transmitted from the user PC 50 through the LAN 12 for each page. The reading mechanism 22 is configured as a scanner mechanism that reads a document by causing a well-known color image sensor to scan, in which reflected light after emitting light toward a document placed on a glass board is decomposed to each color to make read data. The operating panel 23 has a displaying section that is configured as a liquid crystal display for displaying an image, and an operating section in which an inputting section is provided so as to allow a user to conduct various kinds of inputting. The displaying section outputs various kinds of information to a user, and instructions of a user are input by the operating section.

Figure 2:
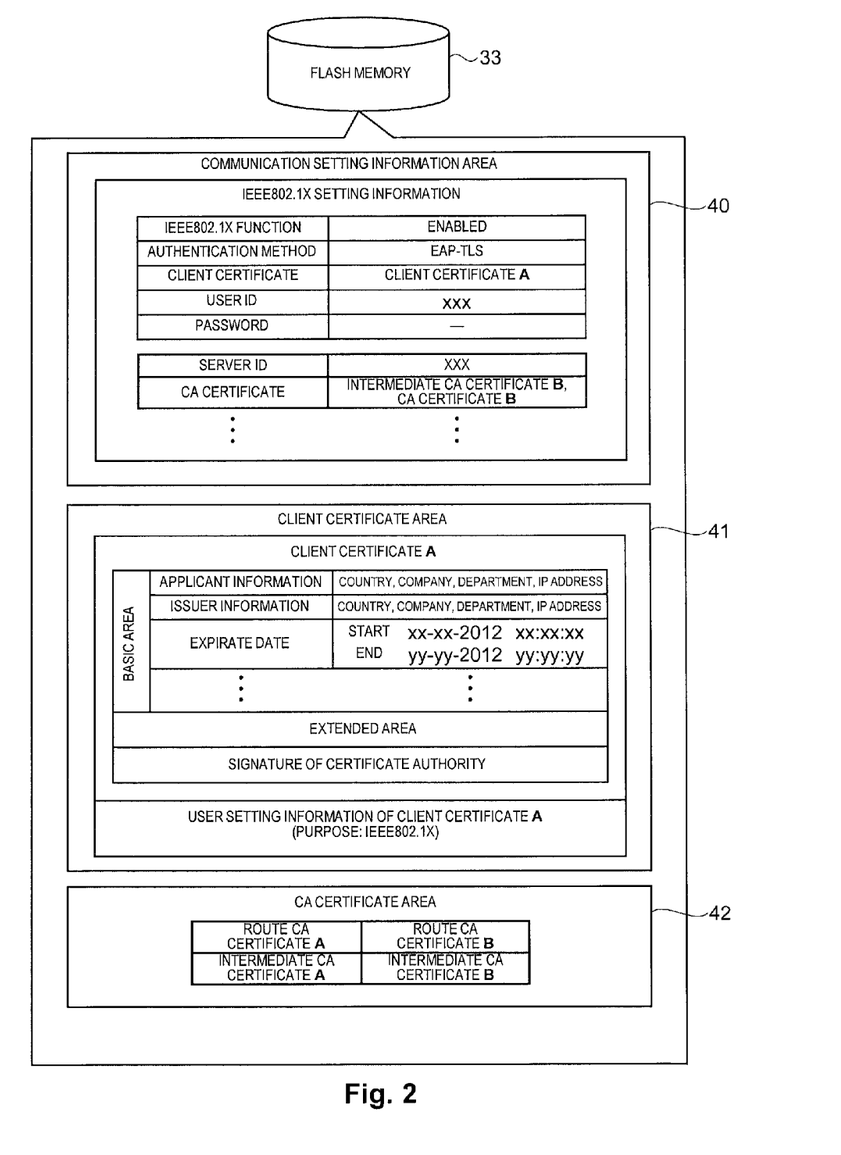
FIG. 2 is a diagram that explains data stored in a flash memory.

The controller 30 of the multi-purpose device 20 serves as the print processing section, and is configured as a microprocessor centered on a CPU 31. The controller 30 of the multi-purpose device 20 includes a RAM 32 that temporarily stores data or saves data, and a flash memory 33 that can store and rewrite various kinds of processing programs or various kinds of data. The flash memory 33 has a communication setting information area 40, a client certificate area 41, and a CA certificate area 42. The communication setting information area 40 stores communication setting information for communicating with another device through the communication OF 26. The client certificate area 41 stores an electronic certificate (also referred to as a client certificate) for certifying the multi-purpose device 20 itself. The CA certificate area 42 stores a CA certificate (a route CA certificate and an intermediate CA certificate). FIG. 2 is a diagram that explains data stored in the flash memory 33. As shown in the drawing, the communication setting information area 40 stores various kinds of setting information needed for communication such as IEEE (Registered Trademark) 802.1X setting information for conduct communication in accordance with IEEE (Registered Trademark) 802.1X. Examples of the IEEE (Registered Trademark) 802.1X setting information include information that shows whether IEEE (Registered Trademark) 802.1X is currently enabled or disabled, information that designates an authentication method or a client certificate used for the authentication, and information that designates a user ID, a server ID, and a CA certificate corresponding to the server ID.

The client certificate area 41 stores an electronic certificate for certifying the multi-purpose device 20 itself such as a client certificate "A". The client certificate "A" has a basic area, an extended area, and a signature of the certificate authority. The basic area includes applicant information (also referred to as actor information) that is information on the multi-purpose device 20, its user, and the like, issuer information that is information on the certificate authority who issued the client certificate "A", expiration data, and the like. The applicant information includes a country name, a company name, or a department name of the multi-purpose device 20 and its user, or information on the IP address of the multi-purpose device 20, and the like, for example. If information on the applicant is registered in advance in CSR (certificate signature request), which is not shown in the drawing, transmitted to the certificate authority so as to request issuance of a client certificate, the information will be reflected in the applicant information of the issued client certificate. Therefore, a user or an administrator of the multi-purpose device 20 can arbitrarily determine what kind of information should be included in the applicant information at the time of making the CSR.

The client certificate stored in the client certificate area 41 corresponds to use setting information including information on the client certificate such as a purpose of the client certificate and the like. For example, the client certificate "A" corresponds to use setting information including information that the purpose of the client certificate "A" is IEEE (Registered Trademark) 802.1X. The CA certificate area 42 stores a CA certificate such as route CA certificates "A" and "B", or intermediate CA certificates "A" and "B". The CA certificate stored in the CA certificate area 42 is used for verifying credibility of the client certificate stored in the client certificate area 41, a server certificate acquired in the authentication process, or the like. There are cases in which a certificate chain is constructed in the client certificate stored in the client certificate area 41. In such cases, a series of CA certificate from the client certificate to the route CA certificate correspond to the client certificate.

Back to FIG. 1, the controller 30 inputs various kinds of operation signals or various kinds of detection signals from the printing mechanism 21 and the reading mechanism 22, inputs operation signals that are generated in response to operation of the operating section of the operating panel 23, and inputs various kinds of data, transmitted from another device, through the communication I/F 26. Also, the controller 30 outputs instructions of printing an image to the printing mechanism 21, outputs instructions of reading a document to the reading mechanism 22, displays display instructions or an image to be printed on the display section of the operating panel 23, and outputs various kinds of data, to be transmitted to another device, to the communication I/F 26.

The controller 30 has a communication control section 34, an authentication requesting section 35, and a print control section 36 as functional blocks. These sections achieve predetermined functions by causing hardware including the CPU 31, the RAM 32, or the flash memory 33, and software stored in the RAM 32 or the flash memory 33 to cooperate with each other. The communication control section 34 controls communication with another device connected through the communication I/F 26. The communication control section 34 has the IEEE (Registered Trademark) 802.1X function that is a function as wpa_supplicant to connect to a network such as the LAN 12 by conducting an authentication process with an EAP-TLS method, a PEAP/MSCHAPv2, or the like, in accordance with the IEEE (Registered Trademark) 802.1X standard, or a function of transmitting and receiving data through the network after the authentication process succeeded. Further, the communication control section 34 refers to information of the communication setting information area 40, the client certificate area 41, and the CA certificate area 42 as needed when the authentication process is conducted.

The print control section 36 controls the printing mechanism 21. The print control section 36 transmits print data to the printing mechanism 21, and instructs the printing mechanism 21 to print and generate an image based on the print data onto a medium. Here, in a case where the print control section 36 instructs the printing mechanism 21 to print, the print control section 36 sends a request for authentication to the authentication requesting section 35 before starting a print process. Also, the print control section 36 confirms that the authentication has been finished or a notification that authentication is unnecessary has been received, and instructs to start a print process. Also, the print control section 36 estimates time required for printing. In the present embodiment, as an example of estimation of the required time for printing, estimation is conducted based on the size of print data. Specifically, in the case of an LPR (line printer protocol) that is a protocol commonly used for network printing, after a printer job is received and a control file for printing is received, the size of a data file for printing is transmitted. Also, in the multi-purpose device 20, the warm-up time for enabling a start of a print process and the number of data that can be processed for each unit time are recorded in the main body in advance as the system performance.

When "S" (byte) represents the size of the print data obtained by the LPR, "V" (byte/second) represents the average print processing speed stored in advance as the system performance, and "U" (second) represents the warm-up time, the time required for printing "Q" from receiving data to finishing a print process can be expressed by the following equation:

$$Q=S/V+U \qquad \text{(Equation 1)}$$

However, a correct data file size cannot be acquired depending on the settings of the user side. In such a case, maximum time required for a print process of one page is set as "Q". The authentication requesting section 35 refers to the time required for printing "Q" estimated in this manner as needed. The authentication requesting section 35 sends an authentication requesting signal that requests authentication of the multi-purpose device 20 itself to the authentication switch 60 based on the authentication request sent from the print control section 36 (authentication requesting means).

In the present embodiment, the communication control section 34 retains information on lapse time "P" since the authentication switch 60 requests re-authentication for the last time, and information on the predetermined period of time "T" for the authentication request of the authentication switch 60 in a referable manner. The authentication requesting section 35 acquires information retained by the communication control section 34 or the time required for printing "Q" estimated by the print control section 36, and determines transmission of the authentication requesting signal based on the acquired information. Here, the authentication requesting section 35 judges whether or not the time required for printing "Q" of a next pending print process is longer than remaining time (T−P) until a next re-authentication process is conducted, that is, whether or not a next re-authentication process will be conducted by the end of the print process of the print data. As a result, in a case where it is judged that the time required for printing "Q" is longer as in the following conditional equation and a next re-authentication process will be conducted by the end of the print process of the print data, the authentication requesting signal is transmitted.

$$Q>(T-P) \quad \text{(Equation 2)}$$

On the other hand, in a case where Equation 2 is not satisfied, the authentication requesting signal is not transmitted, and a notification that authentication is unnecessary is sent back to the print control section 36. As a result, the print control section 36 instructs the printing mechanism 21 to conduct printing after the print control section 36 conducts the print process of the print data.

The authentication requesting signal transmitted to the authentication switch 60 is received by the authentication switch 60 through the communication I/F 26 of the multi-purpose device 20, and the communication device authentication section 62 conducts re-authentication of the multi-purpose device 20 based on the received authentication requesting signal. Then, in a case where the re-authentication is finished, a notification that authentication has been finished is sent back to the print control section 36. As a result, the timer for counting in order the authentication switch 60 to conduct re-authentication is reset, and the authentication switch 60 does not request re-authentication until the predetermined period of time "T" passes after the re-authentication. Accordingly, a re-authentication process can be prevented from being conducted during the print process of the print data. Depending on the type of the authentication switch 60, there are cases in which the timer will not be reset. In such cases, the multi-purpose device 20 issues a disconnecting process of the network to the authentication switch 60, and the timer can be reset by conducting an authentication process immediately after that.

The user PC 50 is a well-known general-purpose personal computer in which each function is controlled by a predetermined OS. The user PC 50 is a device that can transmit and receive data by communication with another device (for example, the multi-purpose device 20 or the authentication server 70) connected to a network such as the LAN 12 through the network. The user PC 50 is connected to the authentication switch 60 through a communication I/F 54, for example, by a LAN cable. The user PC 50 has a communication control section 51 as a functional block constructed by a CPU for conducting various kinds of control, a ROM for storing various kinds of control programs, a RAM for temporarily storing data, and the like, and a storing section 53 constructed by an HDD and the like that is a high-capacity memory, as hardware. The user PC 50 also has a display 58 for screen-displaying various kinds of information, and an inputting device 59 for allowing a user to input various kinds of instructions such as a keyboard. Further, a printer driver is installed in the user PC 50 as a function of controlling a print process by the multi-purpose device 20. This printer driver generates a print job (print data) for printing a designated image by the multi-purpose device 20 based on a user's instructions.

The communication control section 51 controls communication with another device connected through the communication I/F 54. For example, the communication control section 51 conducts an authentication process or transmits and receives data after the authentication process succeeded by using communication setting information 56 or a client certificate 57 stored in the storing section 53. Also, the communication control section 51 reads out data stored in the communication setting information area 40 or the like so as to be displayed on the display 58, and stores data, input by a user through the inputting device 59, in the communication setting information area 40 so as to conduct setting or changing. Also, the communication control section 51 outputs print data to the multi-purpose device 20, and inputs image data read out from the multi-purpose device 20. The communication setting information 56 for communicating with another device through the communication I/F 54 or the client certificate 57 for certifying the user PC 50 itself are stored in the storing section 53.

The user PC 50 is directly connected to the multi-purpose device 20 by a LAN cable. It is thus possible to transmit, from the user PC 50 to the multi-purpose device 20, communication setting information such as IEEE (Registered Trademark) 802.1X setting information stored in the communication setting information area 40 of the multi-purpose device 20 or an electronic certificate stored in the client certificate area 41 or the CA certificate area 42, and store it in the flash memory 33.

The authentication server 70 is configured as a RADIUS server. The authentication server 70 is a device that receives an authentication request transmitted from the client such as the multi-purpose device 20 or the user PC 50 through the authentication switch 60, and makes a response with authentication results by conducting an authentication process to the client by an EAP-TLS method in IEEE (Registered Trademark) 802.1X. The authentication server 70 is connected to the LAN 12 through the communication I/F 74. The authentication server 70 has a client authentication section 71 for conducting an authentication process, and a storing section 73 for storing various kinds of programs or various kinds of data. The storing section 73 stores authentication information 76 used for an authentication process such as a CA certificate, an intermediate CA certificate, or a client ID, or a server certificate 78 for certifying the authentication server 70 itself.

Figure 3:
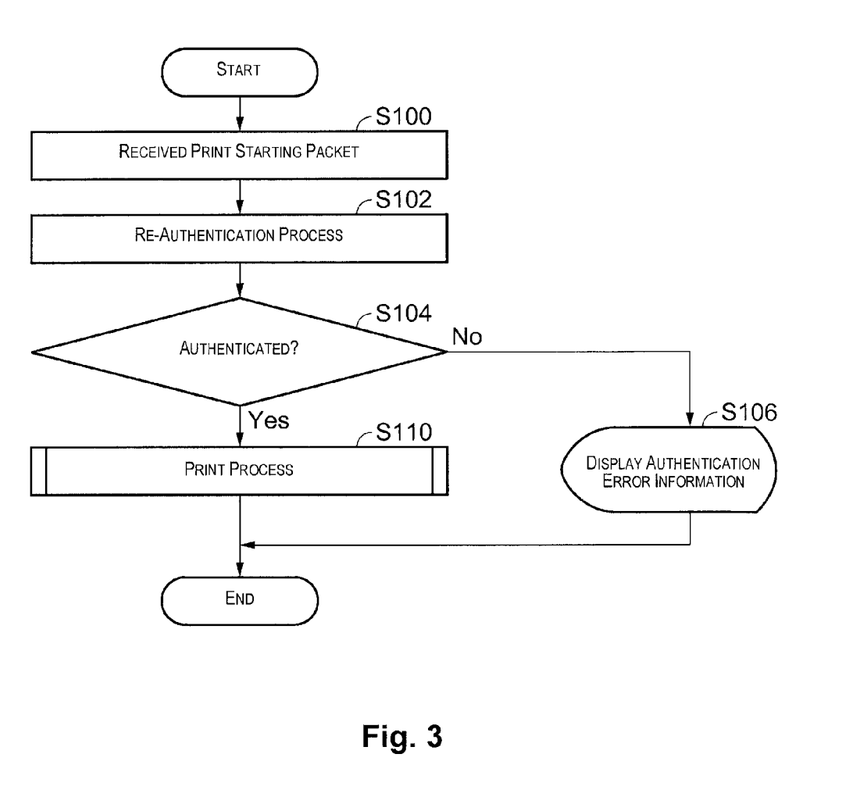
FIG. 3 is a flow chart that shows a flow of a first process in a case where the multi-purpose device receives print data.
Figure 4:
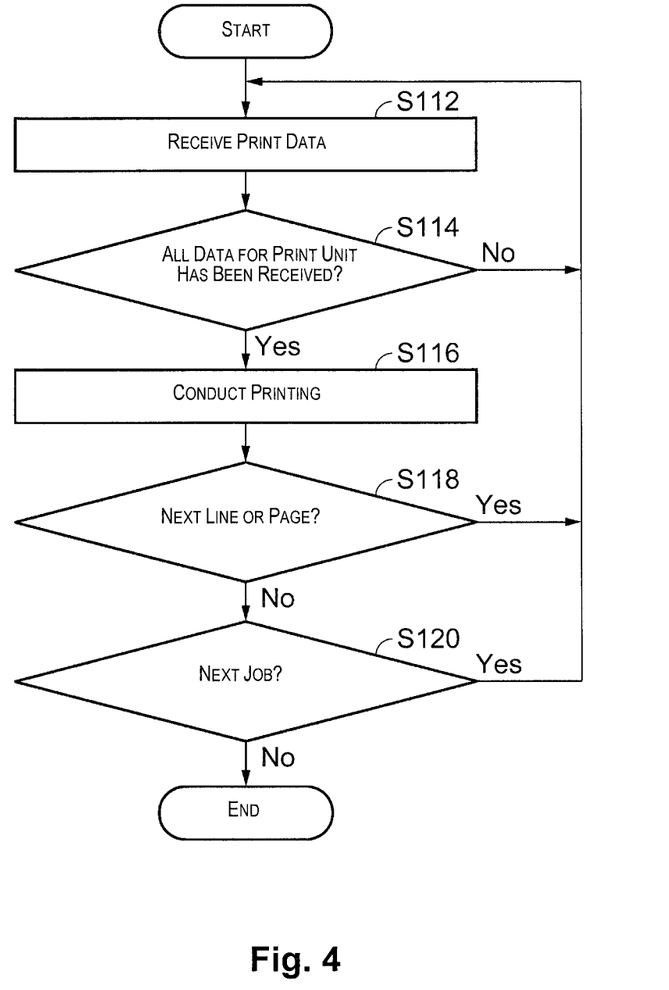
FIG. 4 is a flow chart that shows a flow of printing.

FIG. 3 is a flow chart that shows a flow of a first process in a case where the multi-purpose device 20 receives print data. In the first process, an authentication process is conducted before starting a print process in a case where print data is received. First, the CPU 31 of the multi-purpose device 20 receives a print starting packet (step S100). Next, the CPU 31 requests a re-authentication process with respect to the authentication switch 60 (step S102). Next, the CPU 31 judges whether the authentication succeeded or not (step S104). In a case where the authentication succeeded (Yes in step S104), the CPU 31 conducts a print process (step S110), and a series of processes are finished. On the other hand, in a case where the authentication failed (No in step S104), the CPU 31 displays authentication error information on the operating panel 23 (step S106), and a series of processes are finished without conducting a print process. FIG. 4 is a flow chart that shows the details of the print process of step S110. When the print process is started, the CPU receives print data (step S112). Next, the CPU 31 judges whether all data for a print unit has been received or not (step S114). In a case where all data has not been received (No in step S114), the process returns to step S112. In the present embodiment, the print unit is per line or page. On the other hand, in a case where all data for a print unit has been received (Yes in step S114), the CPU 31 instructs the printing mechanism 21 to conduct printing of the received print data (step S116). As a result, the received print data is printed onto a medium.

Figure 5:
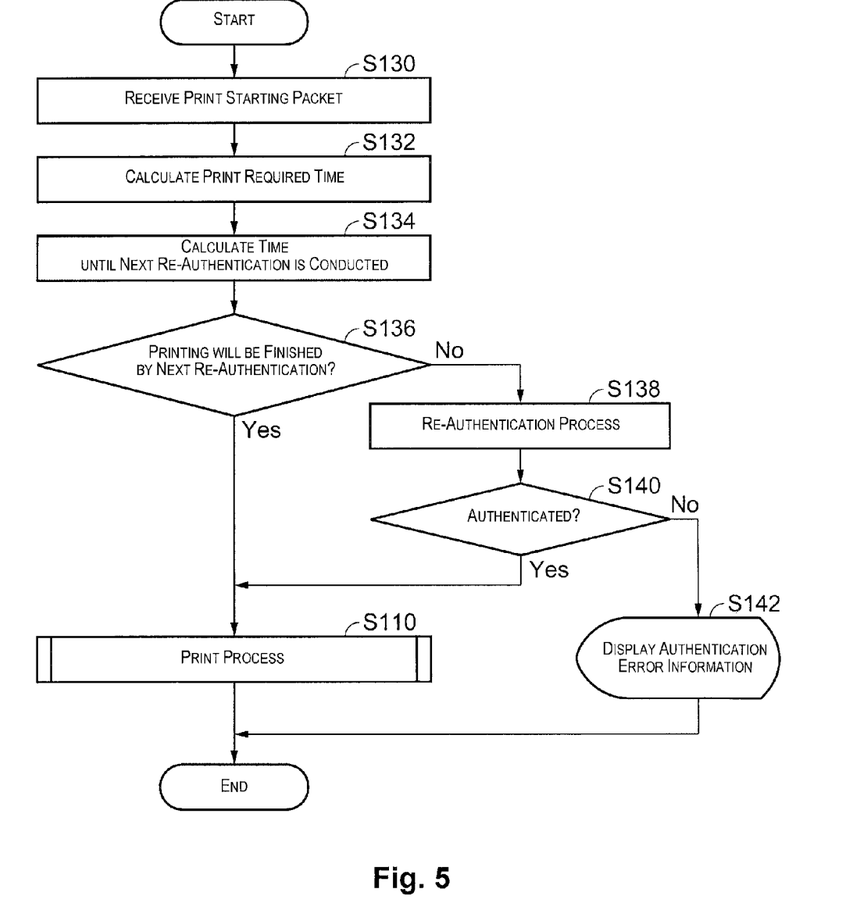
FIG. 5 is a flow chart that shows a flow of a second process in a case where the multi-purpose device receives print data.

Subsequently, the CPU 31 judges whether or not there is print data for a next line or page (step S118). In a case where there is print data for a next line or page (Yes in step S118), the process returns to step S112, and print data is received. On the other hand, in a case where there is no print data for a next line or page (No in step S118), the CPU 31 judges whether or not there is a job to be printed next (step S120). In a case where there is a job to be printed next (Yes in step S120), the process returns to step S112, and print data for the next job is received. On the other hand, in a case where there is no job to be printed next (No in step S120), a series of processes are finished. FIG. 5 is a flow chart that shows a flow of a second process in a case where the multi-purpose device 20 receives print data. In the second process, an authentication process is conducted based on time until next re-authentication in a case where print data is received. First, the CPU 31 of the multi-purpose device 20 receives a print starting packet (step S130). Next, the CPU 31 calculates print required time required for a print process (step S132)<required time calculation step>, and calculates time until next re-authentication is conducted by the authentication switch 60 (step S134) <remaining time calculation step>. Subsequently, the CPU 31 compares the calculated time, and judges whether or not printing will be finished by next re-authentication (step S136) <comparison step>. In a case where it is judged that printing will be finished by next re-authentication (Yes in step S136), the print process (step S110) is conducted, and a series of processes are finished.

On the other hand, in a case where it is judged that printing will not be finished by next re-authentication (No in step S136), the CPU 31 requests the authentication switch 60 to conduct re-authentication (step S138) <authentication process requesting step>. Next, the CPU 31 judges whether or not it was authenticated (step S140). In a case where it was authenticated (Yes in step S140), the CPU 31 conducts the print process (step S110) <print step>, and a series of processes are finished. On the other hand, in a case where it was not authenticated (No in step S140), the CPU 31 displays authentication error information on the operating panel 23 (step S142) <display step>, and a series of processes are finished without conducting a print process.

Figure 6:
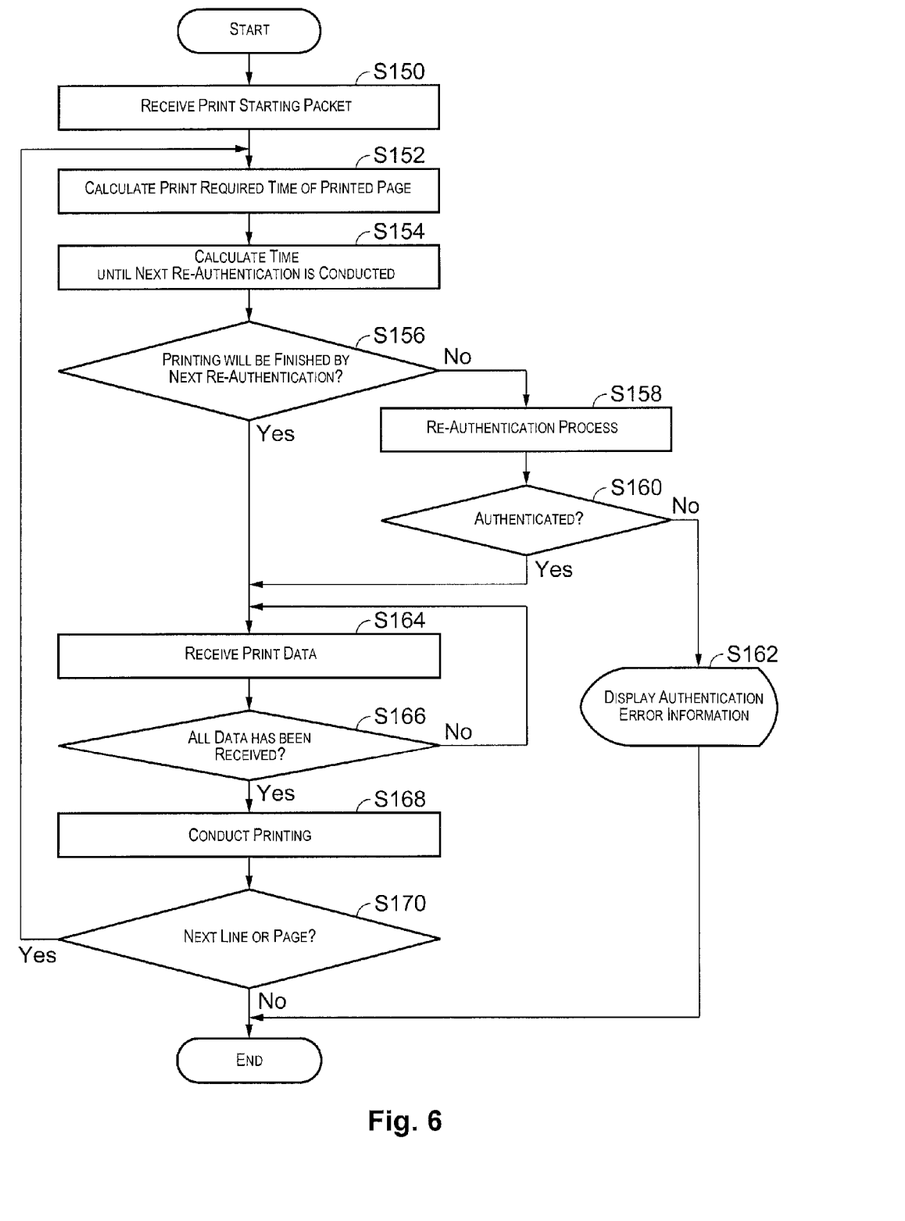
FIG. 6 is a flow chart that shows a flow of a third process in a case where the multi-purpose device receives print data.

FIG. 6 is a flow chart that shows a flow of a third process in a case where the multi-purpose device 20 receives print data. In the third process, an authentication process is conducted for each page based on time until next re-authentication in a case where print data is received. It can be configured that a user can select which of the first process, the second process, and the third process will be conducted by the multi-purpose device 20. First, the CPU 31 of the multi-purpose device 20 receives a print starting packet (step S150). Next, the CPU 31 calculates print required time required for a print process (step S152), and calculates time until next re-authentication is conducted by the authentication switch 60 (step S154). Subsequently, the CPU 31 judges whether or not a print process will be finished by next re-authentication (step S156). In a case where it is judged that a print process will be finished by next re-authentication (Yes in step S156), the process moves on to a step of receiving print data (step S164). On the other hand, in a case where it is judged that a print process will not be finished by next re-authentication (No in step S156), the CPU 31 requests the authentication switch 60 to conduct a re-authentication process (step S158).

Next, the CPU 31 judges whether or not it was authenticated (step S160). In a case where it was authenticated (Yes in step S160), the process moves on to a step of receiving print data (step S164). On the other hand, in a case where it was not authenticated (No in step S160), the CPU 31 displays authentication error information on the operating panel 23 (step S162), and a series of processes are finished without conducting a print process. In the step of receiving print data (step S164), the CPU 31 receives print data. Next, the CPU 31 judges whether all data for a print unit has been received or not (step S166). In a case where all data has not been received (No in step S166), the process returns to step S164.

On the other hand, in a case where all data for a print unit has been received (Yes in step S166), the CPU 31 instructs the printing mechanism 21 to conduct printing of the received print data (step S168). As a result, the received print data is printed. Subsequently, the CPU 31 judges whether or not there is print data for a next line or page (step S170). In a case where there is print data for a next line or page (Yes in step S170), the process returns to step S152, and print required time required for a print process is calculated. On the other hand, in a case where there is no print data for a next line or page (No in step S170), a series of processes are finished.

According to the above-described embodiment, in the first process, re-authentication is conducted always before a print process is conducted. Also, in the second and third processes, if it is assumed that authentication is conducted during printing based on time until a next periodical authentication process and print required time required for a print process of print data, re-authentication is conducted before printing. Consequently, it is possible to prevent printing from being interrupted due to deterioration in the throughput by conducting an authentication process during a print process. A device for implementing the above-described technique includes various kinds of embodiments. There are cases in which it is achieved by a single device, and there are cases in which it is achieved by combining a plurality of devices.

What is claimed is:

1. A printing device, to be connected to an authentication device that disconnects a connection between a device and a network in a case where authentication of the device connected to the network fails, comprising:
   an authentication requesting section programmed to request an authentication process with respect to the authentication device; and
   a print processing section configured to conduct a print process for printing print data,
   the authentication requesting section requesting the authentication process in response to the print processing section receiving a print starting data that indicates a start of the print process for printing the print data before the print processing section starts the print process.

2. The printing device according to claim 1, wherein
   the authentication requesting section requests the authentication process in response to the print processing section receiving the print starting data before the print processing section starts the print process and in response to the authentication requesting section judging that the authentication device conducts a periodical authentication process before the print process is finished after the print process is started by the print processing section.

3. The printing device according to claim 2, wherein
   the authentication requesting section is further programmed to acquire a remaining time and a print required time, the remaining time indicates a time period from a first time when the print starting data is received to a second time when the periodical authentication process is conducted next, the print required time indicates a time that is required to finish conducting the print process for printing the print data, and the authentication requesting section requests the authentication process when the print required time is longer than the remaining time.

4. The printing device according to claim 1, wherein the print processing section starts the print process after the authentication process by the authentication device is finished.

5. The printing device according to claim 1, wherein the authentication device requests the authentication process to an authentication server and receives results of the authentication process from the authentication server in a case of receiving the authentication request form the printing device, and the printing device disconnects a connection to a network through the authentication device in a case where authentication of the device by the authentication process fails.

6. The printing device according to claim 1, wherein
the authentication requesting section requests the authentication process in a case where a print required time is longer than a remaining time, the print required time indicates a time that is required to finish conducting the print process for printing the print data, and the remaining time indicates a time period from a first time when the print starting data is received to a second time when the authentication process that is conducted periodically is conducted next.

7. The printing device according to claim 6, further comprising:

a display section that displays information on authentication error in a case where it is not authenticated in the authentication process.

8. A printing system, in which an authentication device connected to a printing device causes an authentication server to conduct an authentication process for authentication of a device, and a connection between the printing device and a network is disconnected in a case where the authentication of a device by the authentication process fails, the printing device comprising:
an authentication requesting section programmed to request the authentication process with respect to the authentication device; and
a print processing section configured to conduct a print process for printing print data,
the authentication requesting section requesting the authentication process in response to the print processing section receiving a print starting data that indicates a start of the print process for printing the print data before the print processing section starts the print process.

9. A method for controlling a printing device to be connected to an authentication device that disconnects a connection between a device and a network in a case where authentication of the device connected to the network fails, the method comprising:

requesting an authentication process with respect to the authentication device; and
conducting a print process for printing print data;
the requesting of the authentication process including requesting the authentication process in response to receiving a print starting data that indicates a start of the print process for printing the print data before the print process is started.

* * * * *